Feb. 11, 1947.　　　R. C. ISABELL ET AL　　　2,415,694
REPLACEABLE CELL STORAGE BATTERY
Filed Nov. 1, 1943
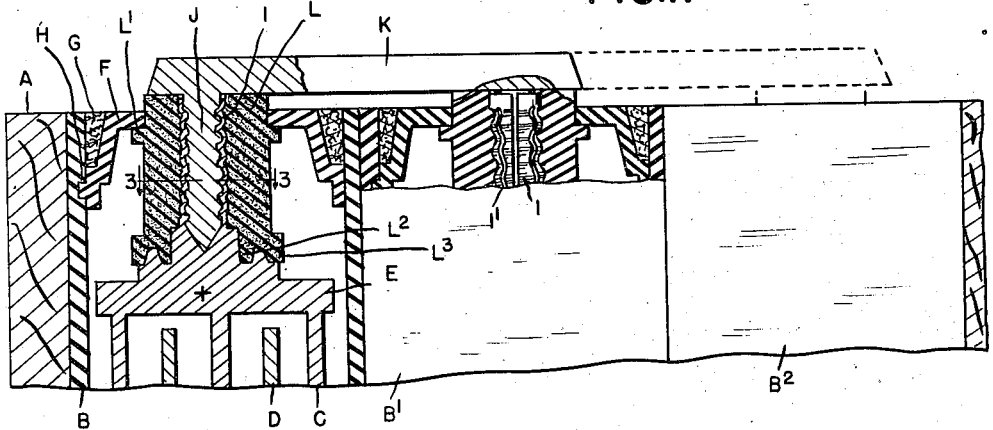
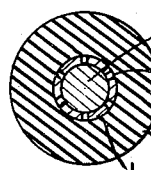
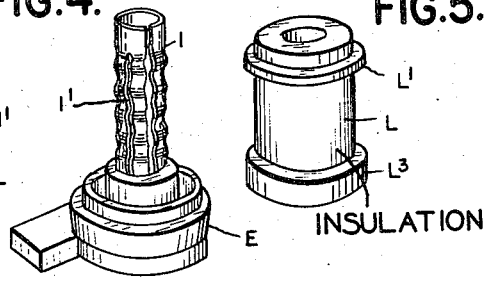
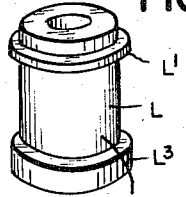
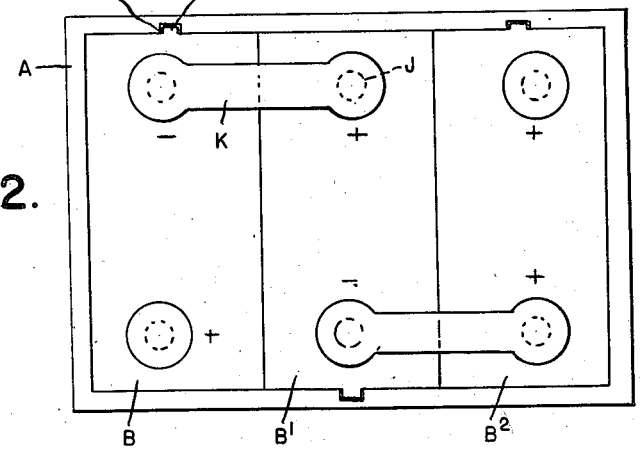
INVENTORS
ROBERT C. ISABELL
BY  JAMES SAWDON
ATTORNEYS Patented Feb. 11, 1947

2,415,694

UNITED STATES PATENT OFFICE 2,415,694

REPLACEABLE CELL STORAGE BATTERY

Robert C. Isabell and James Sawdon,
Port Huron, Mich.

Application November 1, 1943, Serial No. 508,526

4 Claims. (Cl. 136—134)

The invention relates to storage batteries and has for its object the obtaining of a construction in which it is possible to remove and replace a dead cell without destroying or injuring other parts.

In the present state of the art it is usual to construct storage batteries with a plurality of cells which are connected in series and are contained within an outer box. If one of the cells becomes short-circuited or is otherwise put out of action, the whole battery becomes useless as it is practically impossible to remove the dead cell without injury to other parts. To overcome this defect our invention consists in a construction in which the several cells of the battery are individually removable from the outer box and without detriment to the remaining cells.

The invention further consists in a construction in which the electrical connections between adjacent cells are quickly and easily detached.

The invention further consists in the novel construction in the arrangement of parts as hereinafter set forth.

In the drawing:

Fig. 1 is a section partly in elevation of a battery embodying our improved construction;

Fig. 2 is a plan view thereof;

Fig. 3 is a section on line 3—3, Fig. 1;

Fig. 4 is a perspective view of one of the terminal posts; and

Fig. 5 is a perspective view of the resilient insulator sleeve which surrounds the post to hold the same in contact with the connector.

A is the ordinary outer box or container for a storage battery and B, B' and B² are individual cells placed in this box. Each cell contains positive and negative plates C and D of usual construction and connected respectively to headers E, only one of which is illustrated. The cell is closed by an insulator cover plate F which is sealed by wax or other sealing material G so as to be liquid tight. It is also secured in position by providing one or more lugs H thereon adapted to engage corresponding recesses in the walls of the cells. These will resist any upward pull upon the cover incident to the detachment of the electrical connector as hereinafter set forth. Each of the heads E is provided with a terminal post E' extending outward through an aperture in the cover plate for engagement with the connector K coupling it with an adjacent cell. Usually the coupling connections between adjacent cells are permanently attached to the posts so as to prevent removal therefrom. In our improved construction we have provision for the quick detachment of the connectors from the posts and, as specifically shown, this is accomplished by providing the head with a split socket I adapted for the engagement of a plug J integral with the connector K. The head E is formed of non-resilient metal (lead) and, as the socket I is integral with the head, it is also non-resilient. We, therefore, surround the socket with a resilient sleeve L preferably formed of rubber which exerts a radially inward pressure thereon. Also, the walls of the socket are preferably corrugated to engage corresponding corrugations on the plug J and a plurality of slots I' in the socket permit radial movement of the segments therebetween. Thus, to form the electrical connection it is only necessary to press the plug J into the socket I expanding the latter against the resilient pressure of the sleeve L. This permits the corrugations to pass each other and, after the plug is fully entered, the socket will be contracted around the plug to form good electrical contact. In addition to its function of contracting the socket, the sleeve L forms a sealing connection with the cover F around the aperture therein. As shown, the sleeve is provided with an annular flange L' engaging the inner side of the cover F and is further provided at its lower end with a portion L² for engaging a groove at the base of the socket. This in connection with a depending annular flange L³ forms a liquid seal which prevents creeping of the electrolyte upward to the socket and plug connection.

With the construction as described, whenever one of the cells of the battery ceases to properly function, the connectors K may be quickly detached by drawing them outward for the resilient sleeves L will permit the radial expansion of the sockets I. Also the lug or lugs H will hold the cover plate F from displacement. The cell can then be withdrawn from the box and replaced by a new cell after which the plugs J of the connector K are re-engaged with the sockets. By such replacements the life of the battery may be greatly prolonged.

When a dead cell is exchanged for a replacement, it is necessary that the latter should be placed the right way in the box as otherwise the terminals would not be properly connected. To avoid mistakes in this, the box A is provided with vertical grooves A' in the inner face of the side walls, the grooves corresponding to the two end cells being on one side and for the intermediate cell being on the other side. Ribs B³ are placed on the same side of all cells and thus the two end cells must be arranged the same way and the center cell in the reverse direction. This is proper for coupling the cells in series.

What we claim as our invention is:

1. A storage battery comprising a box, a plurality of separate cells therein individually removable therefrom, each cell having a cover plate and terminal posts passing outward through apertures in said cover plate, and electrical connections between cells including a connector bar extending over posts of adjacent cells, a split socket and a plug, one on each post and the other on the registering portion of the connector bar, all of said parts being formed of non-resilient acid resistant material, and a resilient sleeve surrounding each split socket for pressing the same into electrical contact with the plug engaged therewith.

2. A storage battery comprising a box, a plurality of separate cells therein individually removable therefrom, each cell including a container, a cover plate for said container having interlocking engagement therewith, terminal plugs projecting outward through apertures in said cover plate, and electrical connections between cells including a connector bar extending over posts of adjacent cells, a split socket and a plug, one on each post and the other on the registering portion of said connector, all of said parts being formed of non-resilient acid resistant material, and a resilient sleeve surrounding each split socket for pressing the same into electrical contact with the plug engaged therewith, whereby an outward drawing movement of a connector will detach the same from the posts for removal of a cell.

3. A storage battery comprising a box, a plurality of separate cells therein individually removable therefrom, each cell including a container, a cover plate therefor interlocking therewith and terminal posts projecting outward through apertures in said cover plate, and electrical connections between cells including a connector bar extending over posts of adjacent cells, a split corrugated socket and a corrugated plug therefor, one on each plug and the other on the registering portion of the connector bar, all of said parts being formed of non-resilient acid resistant material, and a resilient sleeve surrounding each split socket permitting the expansion of the same for the insertion or withdrawal of the corrugated plug and normally holding said socket in electrical connection with the plug.

4. A storage battery comprising a box, a plurality of separate cells therein individually removable therefrom, each cell including a container, a cover plate therefor, and terminal posts extending outward through apertures in said cover plate, each post having a non-resilient split socket in the upper portion thereof and a resilient sleeve surrounding said socket and sealing the aperture in said cover plate and an electrical connector between posts of adjacent cells including a bar extending over said posts and plugs depending from said bar for insertion in said split sockets and held in electrical contact therewith by said resilient sleeve.

ROBERT C. ISABELL.
JAMES SAWDON.

REFERENCES CITED

The following references are of record in the file of this patent:

UNITED STATES PATENTS

| Number | Name | Date |
|---|---|---|
| 768,175 | Fritchle | Aug. 23, 1904 |
| 1,981,460 | Miller | Nov. 20, 1934 |
| 1,982,501 | Douglas | Nov. 27, 1934 |
| 2,229,377 | Friang | Jan. 21, 1941 |
| 2,225,460 | Porth | Dec. 17, 1940 |

FOREIGN PATENTS

| Number | Country | Date |
|---|---|---|
| 552,659 | French | Jan. 25, 1925 |